(12) United States Patent
David et al.

(10) Patent No.: US 7,383,915 B2
(45) Date of Patent: Jun. 10, 2008

(54) DRAWBAR FOR POWER-OPERATED INDUSTRIAL TRUCK

(75) Inventors: Bernd David, Henstedt-Ulzburg (DE); Helmut Lohmann, Nartum-Gyhum (DE); Michael Niebuhr, Bargteheide (DE); Volkmar Prehn, Henstedt-Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 215 days.

(21) Appl. No.: 10/969,630

(22) Filed: Oct. 20, 2004

(65) Prior Publication Data

US 2005/0098375 A1 May 12, 2005

(30) Foreign Application Priority Data

Nov. 12, 2003 (DE) ................. 103 52 695

(51) Int. Cl.
*B62D 1/14* (2006.01)

(52) U.S. Cl. .................. 180/332; 180/19.1; 74/488

(58) Field of Classification Search ............... 180/315, 180/332, 19.1; 74/488, 501.6, 502.2, 519, 74/523, 543–551.9
See application file for complete search history.

(56) References Cited

U.S. PATENT DOCUMENTS

| 3,485,391 | A |   | 12/1969 | Johns |
|---|---|---|---|---|
| 4,444,284 | A |   | 4/1984 | Montemurro |
| 4,716,980 | A | * | 1/1988 | Butler ................. 180/19.2 |
| 5,245,144 | A | * | 9/1993 | Stammen ............... 200/61.85 |
| 5,595,259 | A | * | 1/1997 | Gilliland et al. .......... 180/332 |
| D384,478 | S | * | 9/1997 | Prehn et al. ............ D34/35 |
| 6,265,485 | B1 |   | 7/2001 | Trepka et al. |
| 6,276,485 | B1 | * | 8/2001 | Eriksson et al. .......... 180/332 |
| D450,169 | S | * | 11/2001 | Pulskamp et al. ........ D34/35 |
| D450,417 | S | * | 11/2001 | Pulskamp et al. ........ D34/35 |
| D497,463 | S | * | 10/2004 | Swetish ................. D34/35 |
| 7,017,689 | B2 | * | 3/2006 | Gilliland et al. .......... 180/19.1 |
| 7,237,645 | B2 | * | 7/2007 | Lohmann et al. .......... 180/332 |
| 2003/0029648 | A1 | * | 2/2003 | Trego et al. ............. 180/19.1 |

FOREIGN PATENT DOCUMENTS

| DE | 44 13 631 A1 | 10/1995 |
|---|---|---|
| DE | 297 10 503 U1 | 9/1997 |
| EP | 0 538 697 A1 | 4/1993 |
| EP | 1 153 815 A2 | 11/2001 |

* cited by examiner

*Primary Examiner*—Ruth Ilan
*Assistant Examiner*—Leonard McCreary, Jr.
(74) *Attorney, Agent, or Firm*—Hiscock & Barclay, LLP (57) ABSTRACT

A drawbar for power-operated industrial trucks with a drawbar handle which can be pivoted about a horizontal axis in a large angular range between an approximately upright position and a position inclined obliquely to vertical. The drawbar includes a drawbar head arranged at a free end of the drawbar handle, the head including a horn arranged in the extension of the drawbar handle, rod-like grips extending on both sides of the horn and approximately transversely thereto that are connected to carrier sections connected to the horn on both sides via arm sections attached to the end of a grip. The arm and carrier sections form a protective yoke with grip openings and at least one control element for a function of the industrial truck on one grip opening is arranged in the vicinity of the associated carrier section, such that it can be actuated from above by pressure from one finger, even when the hand grasps the rod-like grip facing it. The control element is constructed and arranged, such that with an approximately upright drawbar handle, it can even be actuated from the lower face of the drawbar head by finger or thumb pressure.

51 Claims, 7 Drawing Sheets

DRAWBAR FOR POWER-OPERATED INDUSTRIAL TRUCK

FIELD OF THE INVENTION

The invention relates to a drawbar for a power-operated industrial truck.

BACKGROUND OF THE INVENTION

Hand controlled lift trucks or front loaders have a drawbar with which the industrial truck is steered. The steering of the drawbar takes place at the support for the pivotable drive wheel of the materials handling truck. At the free end a drawbar head is provided which has a plurality of actuation members for operating the industrial truck. Thus for example drive switches are provided, actuation elements for the lifting and lowering operation and the horn. It is known from EP 0 751 060 to attach grips on both sides of a horn, which is arranged in the extension of the drawbar handle, and to attach them to both sides of the horn via a protective bracket. The connection is made via arm sections extending approximately parallel to the horn and via carrier sections which in turn extend approximately parallel to the grips. It is further known from the disclosed prior art, to arrange a drive switch grip respectively between a grip and the horn which can be twisted with the thumbs about an axis which approximately coincides with the axis of the grip. Finally, it is also known from the disclosed publications, to attach to the carrier section a row of control buttons for the lifting and lowering operation, which are actuated by finger pressure when the hand simultaneously grasps the grip.

It is known from EP 1016569 A1 to attach a key pad to the lower face of the drawbar head, via which the operator can insert the authorisation code.

It is known from U.S. Pat. No. 5,595,259 to make the grips of the drawbar head rotatable and to use them for drive control. It is further known to provide the grips with paddle-shaped shoulders in the vicinity of the arm sections, which protrude into the grip area and which can be actuated by the thumbs or a finger when the hand grips the arm section at the side.

It is known that a drawbar of the disclosed type can be pivoted in a large angle between an approximately upright position and a fully lowered position, to be able to maneuver the vehicle in the widest variety of spatial conditions. In the known drawbar embodiments, the control elements of the drawbar head can only be reached with difficulty in the folded up position of the drawbar and generally cannot be observed which makes the operation more difficult. The control elements are generally predominantly round or square in their contour shape and therefore constructed in such a shape that they do not guarantee optimal accessibility of the hand grasping the drawbar head in every position.

SUMMARY OF THE INVENTION

The object of the invention is to produce a drawbar for an industrial truck in which the control elements allow optimal accessibility, optionally also when the drawbar is in the folded up position.

In a drawbar according to one preferred aspect of the present invention, at least one control element is constructed and arranged such that it can be actuated by finger or thumb pressure even from the lower face of the drawbar head when the drawbar handle is approximately upright. Included in this is that the control element is visible for the operator even when the drawbar is upright, so that the operator can securely strike the control element and actuate it by finger or thumb pressure.

In another preferred aspect of the present invention, a possibility for actuation in the disclosed manner is given when the drawbar position is folded up, as a further control element is arranged on the lower face of the drawbar head, approximately oriented toward the control element which is arranged on the upper face. It is understood that the two control elements, namely the one which can be actuated from the upper face and the one from the lower face, control the same function of the industrial truck.

A third preferred aspect of the present invention concentrates above all on the easy accessibility of a control element in a drawbar head in different positions of the operator and the operator's hand on the drawbar head. In this connection it is proposed to construct the control element in the shape of a paddle as a rocker switch, by being rotably mounted about an axis on the carrier section or on the horn.

If actuation of the control element is also provided from the lower face of the drawbar head, the control element can also be paddle-shaped, even when on the upper face and the lower face of the drawbar head a separate control element is respectively provided.

The paddle-shaped control element lies with its axis of rotation approximately in the same plane in which the drawbar head or its centre plane extends. The axis of rotation can extend perpendicular to the axis of the horn or lies in any angle between 90° and 0°. This angle is preferably approximately 20° to 40° to the axis of the horn.

According to a further embodiment of the invention, it is provided that the carrier section comprises a surface section in the vicinity of the horn and/or the horn in the vicinity of the carrier section on the face facing the grip opening, which surface section extends transversely, preferably perpendicular to the plane which is fixed from the grip opening or the centre plane of the drawbar head and the control element is arranged in the vicinity of the surface section. The support of the control element is then preferably such that it is moved approximately parallel to the surface section when it is actuated. The actuation path is dependent on whether the switch to be actuated works digitally or proportionally. In the first case a relatively short operating path is sufficient. In the second case, the actuation path is correspondingly longer to allow sensitive operation.

For aesthetic, but also for ergonomic reasons, the inner face of the horn and/or carrier section which faces the grip opening, form(s) a rounding via which the carrier section merges with the horn. As a result an embodiment of the invention provides that the surface section is concave or has a curved contour and the faces facing these surface sections of the control element are convex. If adapted to the disclosed shaping, the control element can be banana-shaped or circular segment-like in plan view.

The paddle-shaped control element can protrude completely into the grip opening as a type of shoulder. Alternatively, it is provided according to an embodiment of the invention that the surface section has a recess in which the control element is received. According to an embodiment of the invention it can be completely received so that its surface facing the grip opening is terminated flush with the adjoining surfaces of the carrier section and horn.

It is conceivable to arrange a control element in just one grip opening. Preferably a control element is however provided on each side of the horn, the two symmetrically arranged control elements able to actuate the same function of the industrial truck or each effecting another function. In the first case the control elements can sit on a common shaft which preferably is extended approximately perpendicular to the axis of the horn.

For ergonomic and design reasons it is advantageous according to one embodiment of the invention if the upper face and/or the lower face of the control element are/is approximately flush with the surface of the adjacent regions of the drawbar head. The upper face and/or the lower face of the control element can be of continuous concave form or be provided with a trough. Alternatively at the ends of the upper face and/or lower face of the control element trough-like recesses can be provided to facilitate the actuation of the switch. Moreover the upper face and/or lower face can be provided with a face which is rubber-like or otherwise sufficiently rough to facilitate the actuation.

BRIEF DESCRIPTION OF THE DRAWINGS

Embodiments of the invention will emerge in more detail from the following description with reference to the drawings, in which.

DETAILED DESCRIPTION

A drawbar head is indicated in FIGS. 1 to 10 which is generally referred to by 10 and in its basic configuration is similarly constructed in all the Figures. It is connected via a shoulder 12 to a drawbar handle or drawbar tube of an industrial trucks, not shown. The drawbar handle is pivotally mounted about a horizontal axis and covers a larger angular range from an approximately upright position to an approximately flat position of the drawbar. In the extension of the drawbar or the shoulder 12, a so-called horn 14 extends and carrier sections 16, 18 are attached to opposing faces of the horn 14. The carrier sections 16, 18 are radiused and merge with arm sections 20, 22 which extend approximately parallel to the horn 14 at a distance therefrom. At the other end, the arm sections 20, 22 are connected to rod-like grips 24, 26 which extend approximately perpendicular to the central axis 28 of the drawbar head 10 in the direction of the horn 14, but end at distance therefrom. The shoulder 12, carrier sections 16, 18, arm sections 20, 22 and grips 24, 26 can together form a plastics component or be formed from two separate shells, of which the separating plane is located in the center plane of the disclosed drawbar head. In the space between the horn 14 and the free ends of the grips 24, 26, drive switches 30, 32 are rotatably mounted and about an axis which approximately coincides with the axis of the grips 24, 26. Grip areas or grip openings 34 or 36 are formed by the carrier sections 16, 18, arm sections 20, 22 and grips 24, 26.

Figure 1:
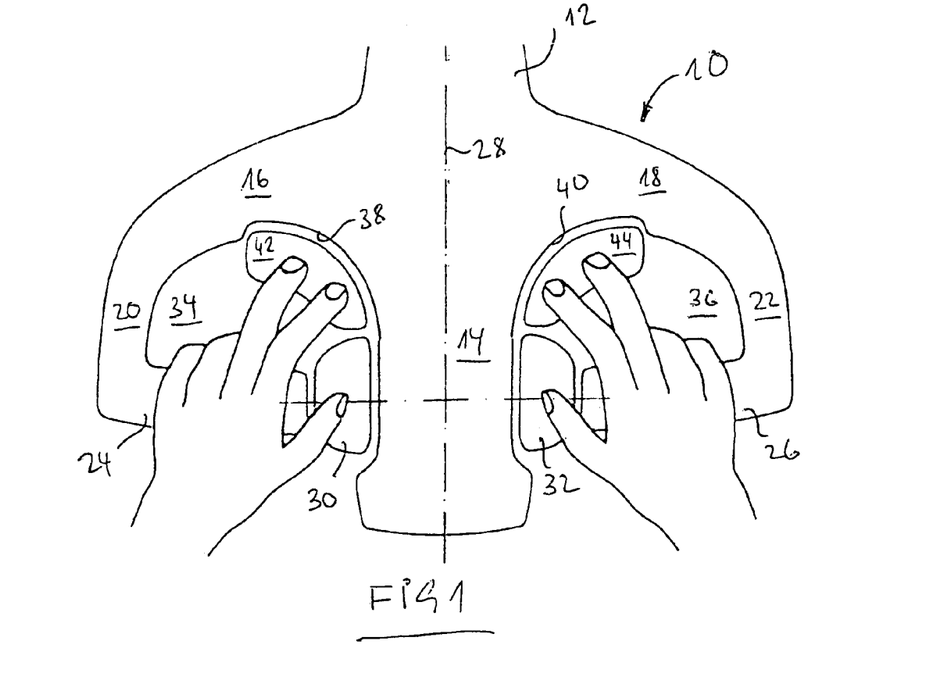
FIG. 1 shows a plan view of a drawbar head of a drawbar according to the invention.
Figure 2:
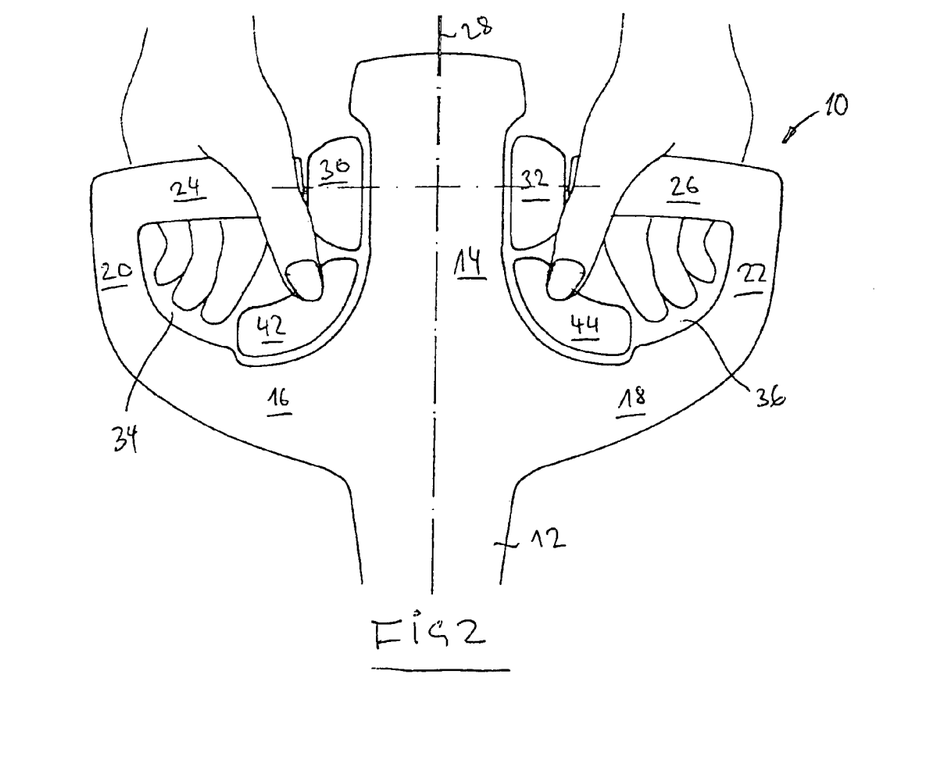
FIG. 2 shows the lower face of the drawbar head according to FIG. 1.

As is seen from looking at FIGS. 1 and 2 together, a concave surface section 38 or 40 is formed in the curved transition region between the carrier section 16, 18 and the horn 14, and which in the carrier section 16, 18 is formed in a flat recess. The surface section extends approximately perpendicular to the centre plane of the drawbar head. Adapted to the contour of the surface section 38, 40 a paddle-shaped or banana-shaped control element 42 or 44 is arranged. As is revealed from both FIGS. 1 and 2, the control element 42, 44 is "continuous"; i.e., it can be actuated both from the upper face according to FIG. 1 and from the lower face according to FIG. 2. FIG. 1 shows the view of the drawbar head which the driver has when the industrial truck is operated with the drawbar. The drawbar head 10 is normally located approximately at hip height. The control elements 42, 44 are constructed as rocker switches; i.e., actuation can take place approximately at the ends of the control element 42, 44, to produce a function of the industrial truck, for example a lifting or lowering process. In FIG. 1 it is shown how, from the operator's point of view with the drawbar head folded down, the control elements 42 can be used with the index and middle fingers. In FIG. 2, the drawbar handle is folded up and the operator sees the underside view of the drawbar head 10. The operator can now actuate a control element 42, 44 with the thumbs, when the grip 24 or 26 is simultaneously grasped. Even with the actuation according to FIG. 1, the control elements 42, 44 are actuated when the grips 24, 26 are grasped simultaneously.

Figure 3:
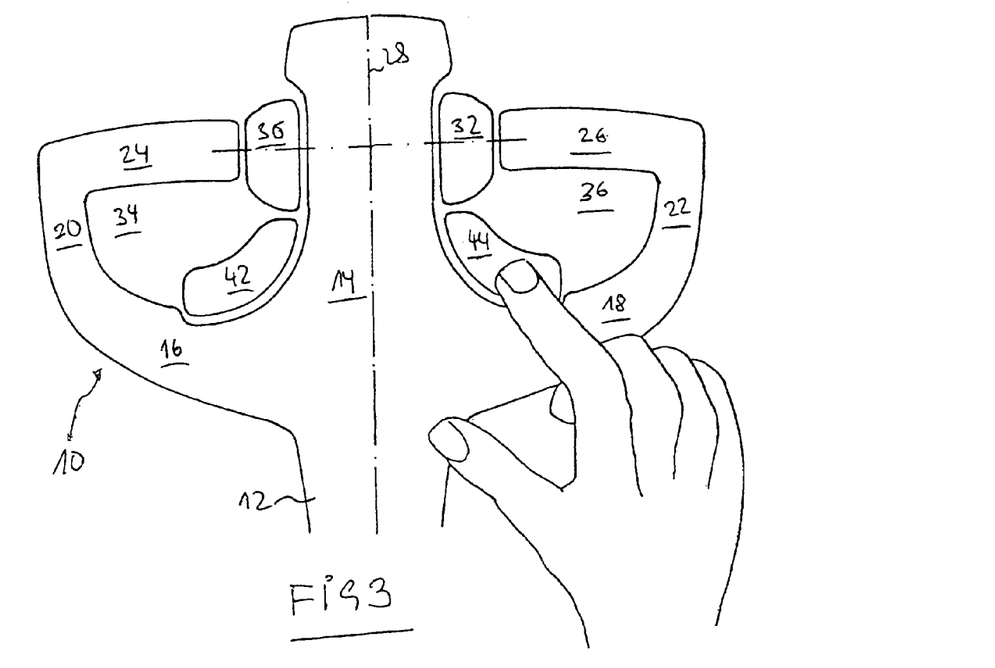
FIG. 3 shows the lower face of the drawbar head according to FIG. 1 with an alternative actuation relative to FIG. 2.
Figure 4:
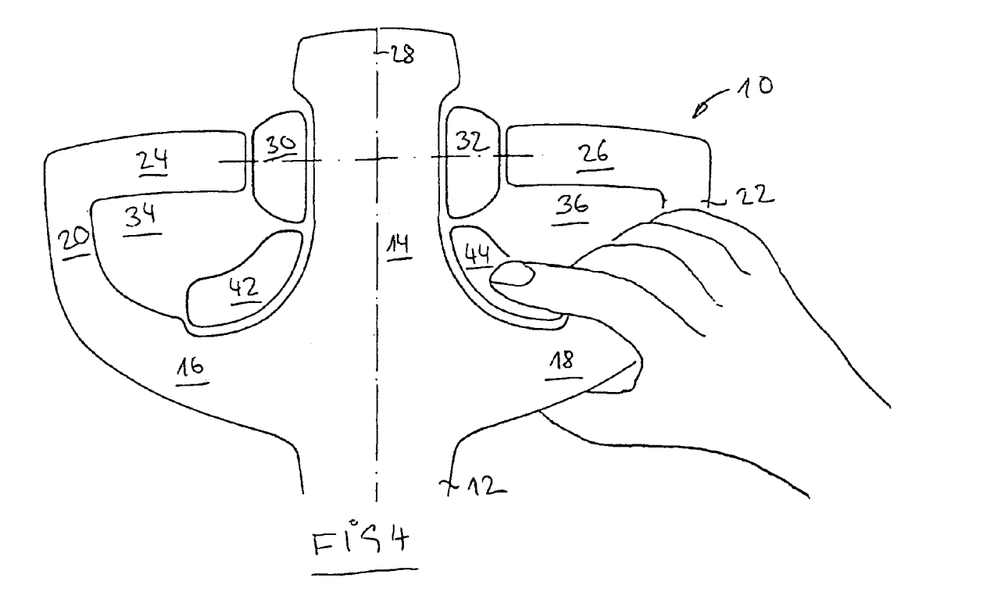
FIG. 4 shows the lower face of the drawbar head according to FIG. 1 with an alternative actuation.
Figures 5, 6, 7:
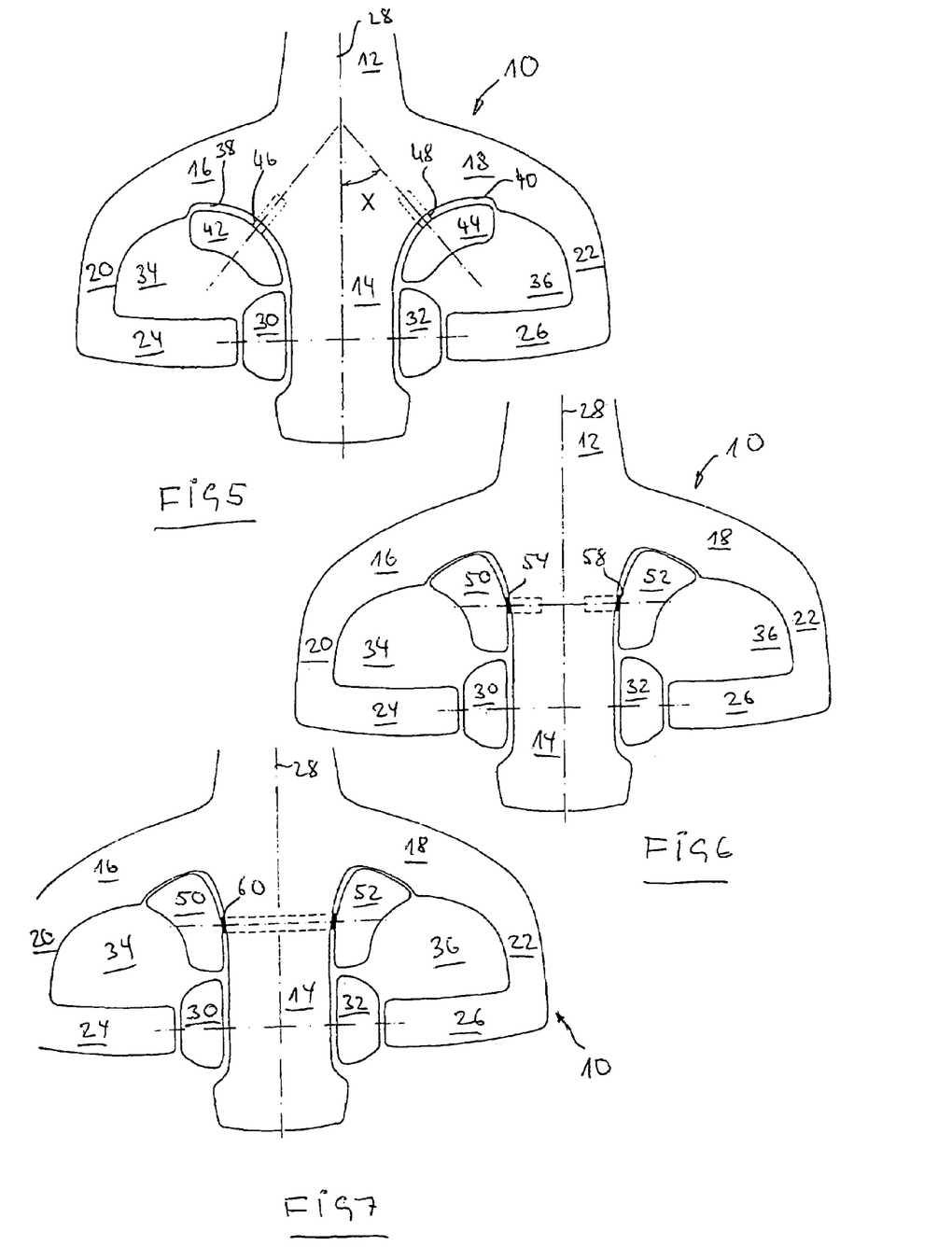
FIG. 5 shows a similar drawbar head to FIG. 1, but additionally with a possibility for supporting the control element indicated.
FIG. 6 shows a further embodiment of the control elements for the drawbar head according to FIGS. 1 or 5.
FIG. 7 shows a third possibility for supporting the control elements of the drawbar head according to FIG. 1.

In FIGS. 3 and 4 the drawbar head 10 is shown in the same view as in FIG. 2; i.e., with the drawbar handle folded up. It can been seen that an actuation element 42, 44 can be operated with the fingers without hand support. FIG. 4 shows how a control element, in this case control element 44, is actuated with the index finger when the arm section 22 or the carrier section 18 is grasped simultaneously by the hand. FIG. 5 shows the same view as FIG. 1. Additionally, in FIG. 5, the support or rotatability of the actuation elements 42, 44 is indicated. Journals are shown by 46 or 48 of which the axis is arranged at an angle x to the axis 28 of the drawbar head 10. The axis of the journals 46, 48 lies approximately in a plane which is formed by the center plane of the drawbar head 10. As is revealed in FIGS. 6 and 7 the angle can also be greater, for example 90° to the axis 28, of which further detail will be given below. The contour shape of the control elements 42, 44, whose face facing the surface section 38, 40 is convex, and whose face facing the grip area 34, 36 is concave, is constructed in order to give on the one hands, free mobility of the hands grasping the grip 24, 26 and on the other hand, a position in the vicinity of the fingers which facilitates as far as possible, the grip of the operating surface.

In FIGS. 1 to 10, the drawbar head 10 is only shown in contour. It is understood that it is a three dimensional body, the region of the horn having a greater thickness than the parts on both sides of the horn. Moreover, upper and lower faces of the grip body are slightly radiused and convex. The upper faces or lower faces of the control elements 42, 44 are such that they are flush with the adjacent surface regions of the drawbar head, so that neither protruding or raised sections nor lowered sections are formed.

As is evident from FIGS. 6 and 7, paddle-shaped control elements 50, 52 are pivotally mounted about an axis which extends perpendicular to the axis 28. In the embodiment according to FIG. 6, each paddle-shaped control element 50, 52 is pivotally mounted by means of a separate journal 54 or 58 in the horn 14. In the embodiment according to FIG. 7, the control elements 50, 52 are pivotally mounted by means of a separate continuous shaft 60. The support according to FIGS. 6 and 7 requires that the control elements 50, 52 have a slightly different contour and in the region located toward the carrier sections 16, 18 are slightly wider than at the end facing the drive switches 30, 32. The faces of the control elements 50, 52 facing the carrier sections 16, 18 or the horn 14 are adapted to the contour of the surfaces which define the grip area 36. The face facing the grip area 34, 36 is concave, so as not to restrict it too far.

In the embodiments according to FIGS. 1 to 6, the control elements 42, 44 or 50, 52 can actuate the same or different functions of the industrial truck, not shown. In the embodiment according to FIG. 7 in which a continuous actuation axis is provided, only the same function can be actuated at any given time.

Figure 8:
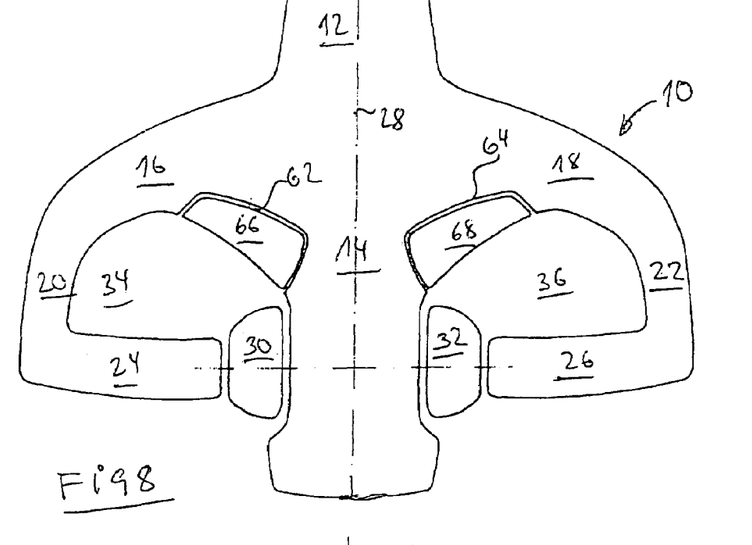
FIG. 8 shows a further embodiment of a drawbar head according to the invention.

In the embodiment according to FIG. 8, the carrier section 16 or 18 and the section of the horn 14 facing it, has an approximately trapezoidal recess 62 or 64, in which a paddle-shaped actuation element 66, 68 is received, it being adapted in its contour to the shape of the recess 62, 64. The face facing the grip area 34, 36 is slightly concave, in order not to restrict the grip area 34, 36.

Figures 9, 10:
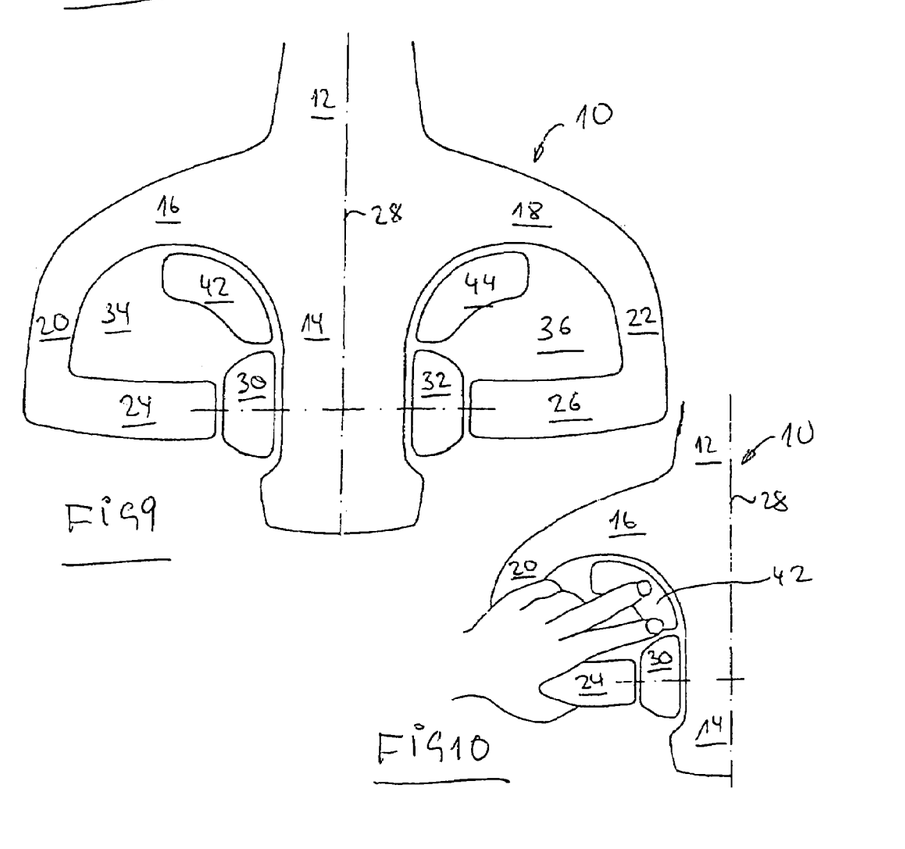
FIG. 9 shows the plan view of a further embodiment according to the invention.
FIG. 10 shows the plan view of the half drawbar head according to FIG. 9 when a control element is actuated at the side.

The embodiment according to FIG. 9 is largely the same as that according to FIG. 1, the control elements 42, 44, which are formed in a similar manner to the control elements according to FIG. 1, being however arranged completely freely in the grip area 34, 36 and being adapted to the rounded contour with their face facing the carrier section 16, 18, via which face the horn 14 merges with the carrier section 16, 18.

For some operating situations, as shown for example in FIG. 10, the embodiment according to FIG. 9 is advantageous as actuation can possibly also usefully take place from the oblique direction to the actuation axis.

The paddle-shaped control elements can be provided with a suitably rough surface, so that the thumbs or the finger actuating them does not slip. Moreover, a trough or even a continuous trough can be formed at the ends. Neither is shown.

Figure 11:
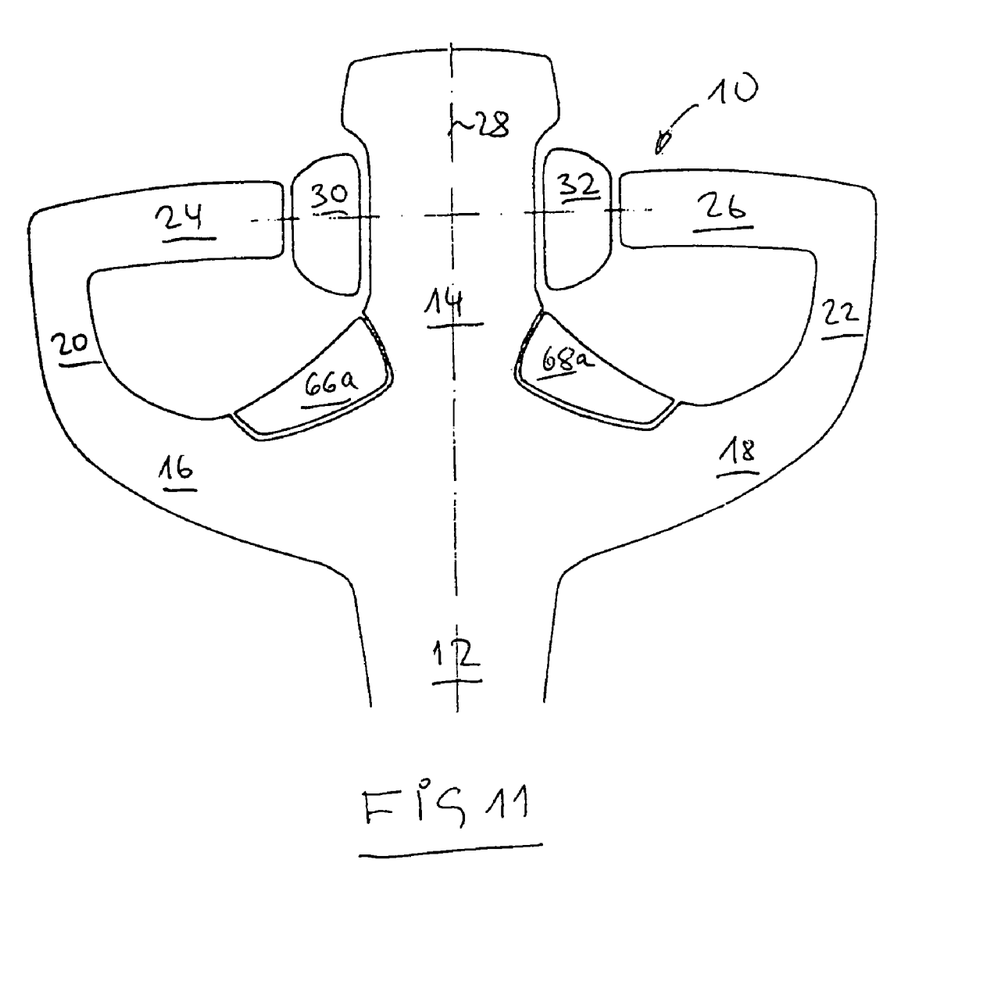
FIG. 11 shows a similar view to FIG. 8 but from the lower face of a drawbar head according to the invention.

It is clear from FIG. 11 that on the lower face of the drawbar head 10 corresponding key elements 66a, 68a are provided, additional to the key elements 66, 68 according to FIG. 8, which can be actuated from the upper face of the drawbar head. Their actuation leads to the same functions as the actuation of the key elements 66, 68. The difference is merely that these functions can also be carried out when the drawbar is folded up.

It is understood that similar control elements, as are shown in the remaining Figures, can also correspondingly be duplicated; i.e., can be actuatable firstly from the upper face and then from the lower face of the drawbar head.

Figure 12:
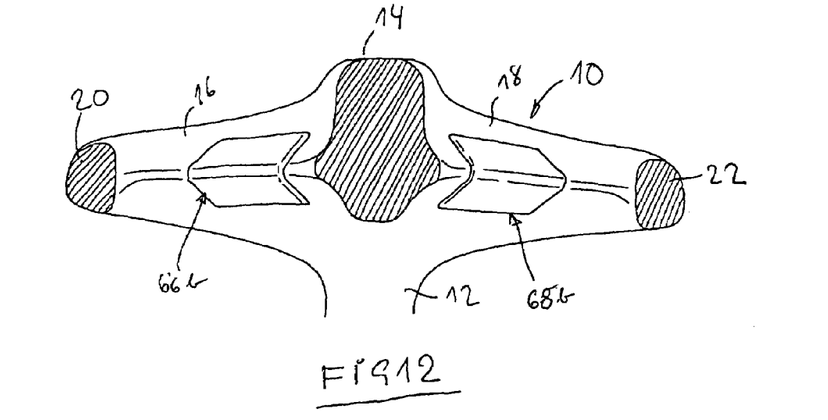
FIG. 12 shows a section through the view according to FIG. 8 along the line 12-12.
Figure 13:
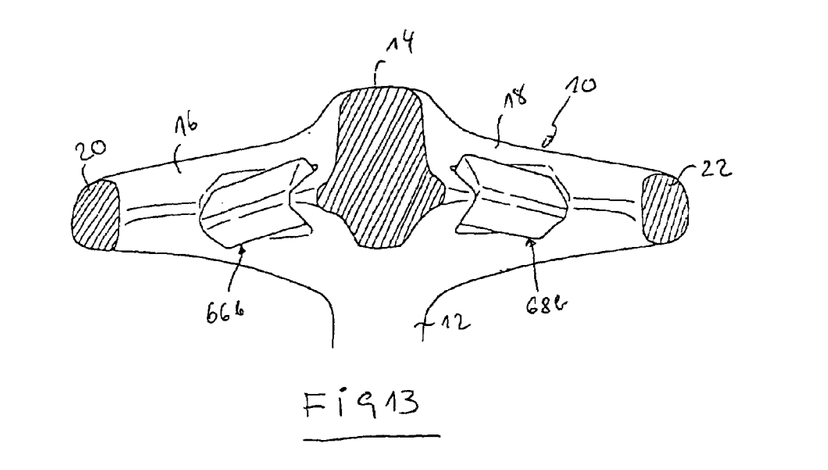
FIG. 13 shows the key elements according to FIG. 12 in a first position.
Figure 14:
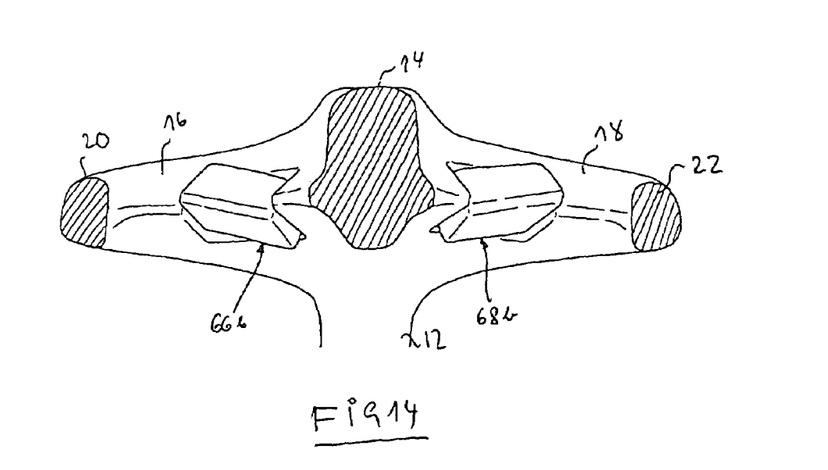
FIG. 14 shows the actuation of the key elements in a second position.

The key elements 66b and 68b according to FIGS. 12 to 14 are arranged in a similar manner to the key elements 66 and 68 according to FIG. 8. The key elements 66b and 68b are also received in corresponding recesses of the carrier sections 16, 18, as is explained in FIG. 8. The only difference between FIG. 8 and FIGS. 12 to 14 is that in the key elements of FIGS. 12-14 have approximately the same width over their extent on both the upper and the lower face. It is further noteworthy that the key elements 66b, 68b are tiltably mounted approximately about an axis, as is indicated in FIG. 5. In FIG. 13, the key elements 66b, 68b are tilted by pressure on the upper surfaces at the respective outer face. It is understood that the same tilting is also obtained when the lower face of the key elements 66b, 68b is lifted up inside.

In the embodiment according to FIG. 14, the tilting movement is opposed to that in FIG. 13. In this case either the upper face of the key elements 66b, 68b is pressed inwardly or the lower face outwardly. It is therefore possible with the aid of the key elements 66b, 68b to activate a lifting and lowering process regardless of the position of the drawbar rod 12.

As is seen particularly in FIGS. 12 to 14, the key elements 66b, 68b are completely incorporated in the carrier sections 16, 18. As the carrier sections 16, 18 have roof-shaped surfaces in the region of the recess for the key elements 66b, 68b, the outer surfaces of the key elements 66b, 68b are also roof-shaped to adapt to the adjacent surfaces of the carrier sections 16, 18.

Figure 15:
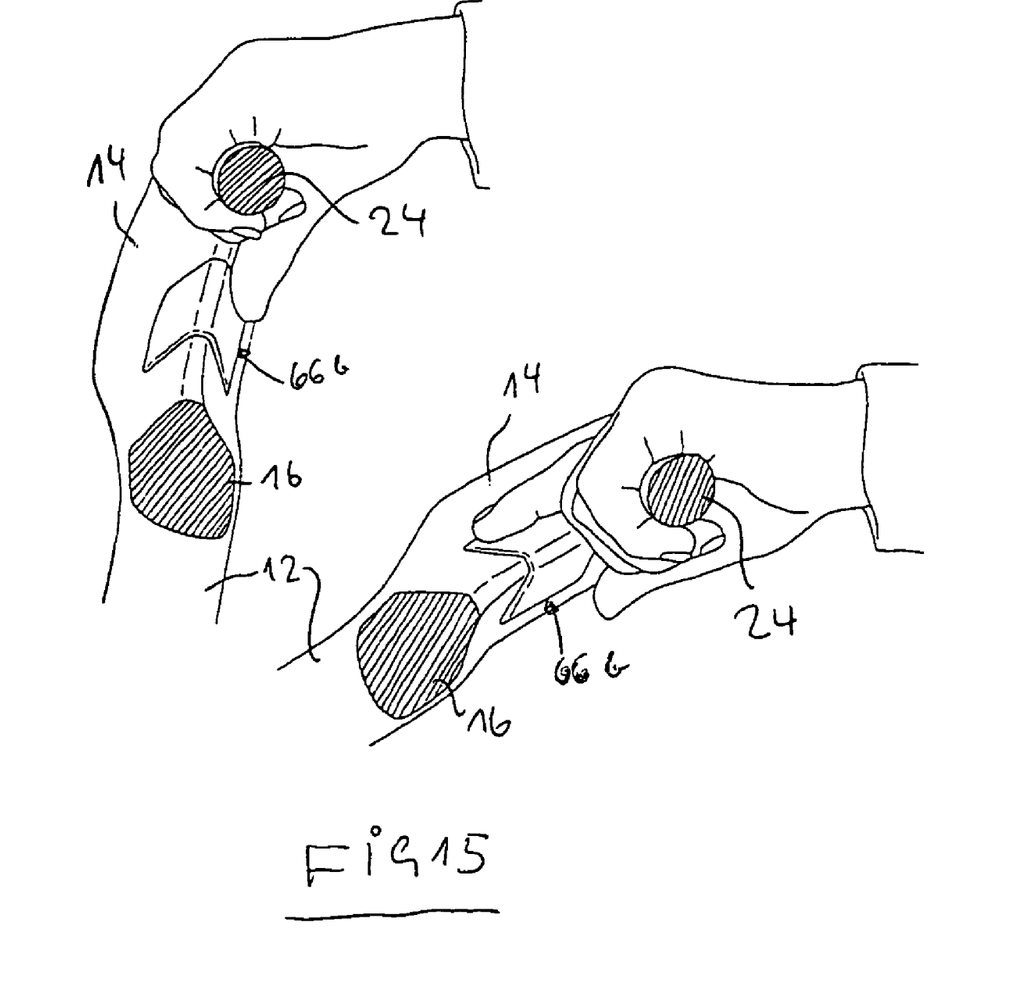
FIG. 15 shows two views of different positions of the drawbar head shown in the preceding figures with actuation of the key elements according to FIGS. 12 to 14.

In the left illustration of FIG. 15, the drawbar rod 12 is approximately upright and it can be seen how the key element 66b can be actuated from the lower face with the thumbs of a hand grasping the grip section 24, in this case on the inner face corresponding to FIG. 13. In the right illustration of FIG. 15, the drawbar rod 12 is in the conventional operating position and it is shown how the key element 66b can be actuated with the index finger from the upper face, corresponding again to the illustration according to FIG. 13.

We claim:

1. Drawbar for power-operated industrial trucks having a drawbar handle which can be pivoted about a horizontal axis in a large angular range between an approximately upright position and a position inclined obliquely to the vertical, a drawbar head arranged at a free end of the drawbar handle, comprising:
   a horn arranged in an extension of the drawbar handle,
   grips extending on opposing sides of the horn and approximately transversely to the horn,
   carrier sections connected to each of said grips and to the horn on both sides via arm sections attached to the end of the grips, the arm sections and carrier sections forming a protective yoke with grip openings and at least one bi-directional control element for a function of the industrial truck on one grip opening which is arranged adjacent to at least one of the carrier and the horn, such that said at least one control element has upper and lower actuating surfaces that are generally shaped to the contour of the carrier and the horn, wherein the control element is actuated from above by pressure using one finger on the upper actuating surface when the drawbar handle is in a position inclined obliquely to vertical, even when the hand grasps the grip facing said element, and actuated in the same manner on the lower actuating surface by finger or thumb pressure when the drawbar handle is in an approximately upright position, wherein the at least one control element is constructed as a rocker switch and is pivotally mounted about a pivot axis on one of the carrier section and the horn, respectively.

2. Drawbar according to claim 1, wherein the carrier section in the vicinity of the horn and/or the horn in the vicinity of the carrier section includes a surface section on the side facing the grip opening which extends transversely, perpendicular, to the centre plane of the drawbar head and the control element is arranged in the vicinity of the surface section and is adapted to its contour.

3. Drawbar according to claim 2, wherein the surface section is concave and the surfaces of the control element facing it are convex.

4. Drawbar according to claim 2, wherein the control element is banana-shaped in plan view.

5. Drawbar according to claim 2, wherein the surface section is formed in a recess of at least one of the carrier section and the horn.

6. Drawbar according to claim 5, wherein the control element is received by the recess and its surface facing the grip opening is terminated flush with the adjacent surfaces of the grip opening.

7. Drawbar according to claim 1, wherein a control element is provided on each side of the horn.

8. Drawbar according to claim 7, wherein the control elements actuate the same function of the industrial truck.

9. Drawbar according to claim 7, wherein the control elements actuate different functions of the industrial truck.

10. Drawbar according to claim 1, wherein the control elements sit on a common shaft which extends approximately perpendicular to the axis of the horn.

11. Drawbar according to claim 1, wherein the upper face and/or the lower face of the control elements are approximately flush with the surface of the adjacent surface regions of the drawbar head.

12. Drawbar according to claim 1, wherein the upper face and/or the lower face of the control element includes a convex or trough-like form throughout.

13. Drawbar according to claim 1, wherein the upper face and/or the lower face of the control element includes trough-like recesses on free ends thereof.

14. Drawbar according to claim 1, wherein the upper face and/or the lower face of the control element includes a rubber-like or otherwise rough surface.

15. Drawbar according to claim 1, wherein the control element serves to actuate the lifting/lowering function of a load-carrying means of the industrial truck.

16. Drawbar according to claim 1, wherein the carrier section in the vicinity of the horn and/or the horn in the vicinity of the carrier section includes a surface section on the side facing the grip opening which extends transversely, perpendicular, to the centre plane of the drawbar head and the control element is arranged in the vicinity of the surface section and is adapted to its contour.

17. Drawbar according to claim 16, wherein the surface section is concave and the surfaces of the control element facing it are convex.

18. Drawbar according to claim 16, wherein the control element is banana-shaped in plan view.

19. Drawbar according to claim 16, wherein the surface section is formed in a recess of at least one of the carrier section and the horn.

20. Drawbar according to claim 19, wherein the control element is received by the recess and its surface facing the grip opening is terminated flush with the adjacent surfaces of the grip opening.

21. Drawbar according to claim 1, wherein the pivot axis of the control element is arranged approximately in the center plane of the drawbar head.

22. Drawbar according to claim 1, wherein the angle x of the axis of the control element to the axis of the horn lies between approximately 20° and 0°.

23. Drawbar according to claim 22, wherein the angle x is approximately 20° to 40°.

24. Drawbar according to claim 23, wherein the control elements actuate the same function of the industrial truck.

25. Drawbar according to claim 23, wherein the control elements actuate different functions of the industrial truck.

26. Drawbar according to claim 1, wherein a control element is provided on each side of the horn.

27. Drawbar according to claim 1, wherein the control elements sit on a common shaft which extends approximately perpendicular to the axis of the horn.

28. Drawbar according to claim 1, wherein the upper face and/or the lower face of the control elements are approximately flush with the surface of the adjacent surface regions of the drawbar head.

29. Drawbar according to claim 1, wherein the upper face and/or the lower face of the control element includes a convex or trough-like form throughout.

30. Drawbar according to claim 1, wherein the upper face and/or the lower face of the control element includes trough-like recesses on free ends thereof.

31. Drawbar according to claim 1, wherein the upper face and/or the lower face of the control element includes a rubber-like or otherwise rough surface.

32. Drawbar according to claim 1, wherein the control element serves to actuate the lifting/lowering function of a load-carrying means of the industrial truck.

33. Drawbar for power-operated industrial trucks with a drawbar handle which can be pivoted about a horizontal axis in a large angular range between an approximately upright position and a position inclined obliquely to the vertical, a drawbar head arranged at a free end of the drawbar handle, said drawbar comprising
   a horn arranged in the extension of the drawbar handle
   grips extending on opposing sides of the horn and approximately transversely to the horn,
   carrier sections connected to the horn on both sides via arm sections attached to the end of each grip, said arm sections and said carrier sections forming a protective yoke with grip openings,
   a first control element for a function of the industrial truck on one grip opening which is arranged in the vicinity of an associated carrier section, such that said first control element is generally shaped to the contour of the carrier and horn combination and actuated from above by pressure from one finger, even when the hand grasps the grip facing said element, and
   a second control element formed approximately the same as the first control element arranged and constructed beneath the first control element, such that with an approximately upright drawbar handle said second control element can also be actuated from a lower face of the drawbar head by finger or thumb pressure, said second control element comprising a switch and being generally shaped to the contour of the carrier and horn.

34. Drawbar according to claim 33, including two control elements each constructed as paddle-shaped rocker switches and pivotally mounted about an axis on the carrier section or the horn.

35. Drawbar according to claim 34, wherein the angle x of the axis of the control elements to the axis of the horn lies between approximately 90° and 0°.

36. Drawbar according to claim 35, wherein the angle x is approximately 20° to 40°.

37. Drawbar according to claim 33, wherein the pivot axis of the control elements is arranged approximately in the center plane of the drawbar head.

38. Drawbar according to claim 33, wherein the carrier section in the vicinity of the horn and/or the horn in the vicinity of the carrier section includes a surface section on the side facing the grip opening which extends transversely, perpendicular to the center plane of the drawbar head and the at least one control element is arranged in the vicinity of the surface section and is adapted to its contour.

39. Drawbar according to claim 38, wherein the surface section is concave and the surfaces of the control element facing it are convex.

40. Drawbar according to claim 38, wherein the control element is banana-shaped in plan view.

41. Drawbar according to claim 38, wherein the surface section is formed in a recess of at least one of the carrier section and the horn.

42. Drawbar according to claim 41, wherein the control element is received by the recess and its surface facing the grip opening is terminated flush with the adjacent surfaces of the grip opening.

43. Drawbar according to claim 33, wherein a control element is provided on each side of the horn.

44. Drawbar according to claim 43, wherein the control elements actuate the same function of the industrial truck.

45. Drawbar according to claim 43, wherein the control elements actuate different functions of the industrial truck.

46. Drawbar according to claim 33, wherein the control elements sit on a common shaft which extends approximately perpendicular to the axis of the horn.

47. Drawbar according to claim 33, wherein the upper face and/or the lower face of the control elements are approximately flush with the surface of the adjacent surface regions of the drawbar head.

48. Drawbar according to claim 33, wherein the upper face and/or the lower face of the control element includes a convex or trough-like form throughout.

49. Drawbar according to claim 33, wherein the upper face and/or the lower face of the control element includes trough-like recesses on free ends thereof.

50. Drawbar according to claim 33, wherein the upper face and/or the lower face of the control element includes a rubber-like or otherwise rough surface.

51. Drawbar according to claim 33, wherein the control element serves to actuate the lifting/lowering function of a load-carrying means of the industrial truck.

\* \* \* \* \*

UNITED STATES PATENT AND TRADEMARK OFFICE
CERTIFICATE OF CORRECTION

PATENT NO.        : 7,383,915 B2
APPLICATION NO.   : 10/969630
DATED             : June 10, 2008
INVENTOR(S)       : Bernd David et al.

Page 1 of 1

It is certified that error appears in the above-identified patent and that said Letters Patent is hereby corrected as shown below:

Col. 8- claim 22, line 10, please replace "20°" with --90°--.

Signed and Sealed this

Fourteenth Day of October, 2008

JON W. DUDAS
*Director of the United States Patent and Trademark Office*